US012613370B2

(12) United States Patent
Chriki et al.

(10) Patent No.: US 12,613,370 B2
(45) Date of Patent: Apr. 28, 2026

(54) MANUFACTURING METHOD FOR A WAVEGUIDE

(71) Applicant: Lumus Ltd., Ness Ziona (IL)

(72) Inventors: Ronen Chriki, Ness Ziona (IL); Edgar Friedmann, Ness Ziona (IL); Ido Fuchs, Ness Ziona (IL)

(73) Assignee: Lumus Ltd., Ness Ziona (IL)

( * ) Notice: Subject to any disclaimer, the term of this patent is extended or adjusted under 35 U.S.C. 154(b) by 0 days.

(21) Appl. No.: 19/120,997

(22) PCT Filed: Jan. 15, 2024

(86) PCT No.: PCT/IB2024/050385
§ 371 (c)(1),
(2) Date: Apr. 14, 2025

(87) PCT Pub. No.: WO2024/150198
PCT Pub. Date: Jul. 18, 2024

(65) Prior Publication Data
US 2026/0110833 A1 Apr. 23, 2026

Related U.S. Application Data

(60) Provisional application No. 63/439,127, filed on Jan. 15, 2023.

(51) Int. Cl.
*G02B 6/00* (2006.01)
*F21V 8/00* (2006.01)
*G02B 27/01* (2006.01)

(52) U.S. Cl.
CPC ......... *G02B 6/0065* (2013.01); *G02B 6/0018* (2013.01); *G02B 6/0076* (2013.01); *G02B 27/0172* (2013.01)

(58) Field of Classification Search
CPC ... G02B 6/0065; G02B 6/0018; G02B 6/0076
See application file for complete search history.

(56) References Cited

U.S. PATENT DOCUMENTS 6,829,095 B2 12/2004 Amitai
9,040,808 B2 * 5/2015 Morgan ................ H10F 77/488
136/246

(Continued)

FOREIGN PATENT DOCUMENTS

WO 2022180634 A1 9/2022
WO 2024154042 A1 7/2024

OTHER PUBLICATIONS

International Search Report and Written Opinion issued for corresponding International Patent Application No. PCT/IB2024/050385, mailed Apr. 26, 2024.

*Primary Examiner* — Gerald J Sufleta, II
(74) *Attorney, Agent, or Firm* — Renner, Otto, Boisselle & Sklar, LLP

(57) ABSTRACT

A method of manufacturing waveguides for head mount displays may include bonding a first set of waveguide elements with one or more adhesives sensitive to thermal or chemical removal and a second set of waveguide elements with one or more adhesives insensitive to thermal or chemical removal to form a waveguide stack, cutting the waveguide stack to form waveguide structures with embedded facets or diffractive elements, and removing portions corresponding to the first set of waveguide elements using a thermal or chemical removal while portions corresponding to the second set of waveguide elements remain bonded.

16 Claims, 18 Drawing Sheets

(56)     References Cited

U.S. PATENT DOCUMENTS

| | | | |
|---|---|---|---|
| 11,448,816 B2 | 9/2022 | Danziger et al. | |
| 11,667,004 B2 | 6/2023 | Maziel et al. | |
| 11,747,137 B2 | 9/2023 | Eisenberg | |
| 11,822,053 B2 | 11/2023 | Danziger et al. | |
| 11,886,008 B2 | 1/2024 | Chriki et al. | |
| 11,933,985 B2 | 3/2024 | Fuchs et al. | |
| 12,055,385 B1 | 8/2024 | Gelberg et al. | |
| 12,061,080 B1 | 8/2024 | Gelberg et al. | |
| 2014/0177035 A1 | 6/2014 | Tani et al. | |
| 2016/0245986 A1* | 8/2016 | Ligas ................... | G02B 6/0088 |
| 2017/0207600 A1 | 7/2017 | Klamkin et al. | |
| 2023/0031913 A1 | 2/2023 | Ishikawa et al. | |
| 2023/0417543 A1 | 12/2023 | Eisenberg | |
| 2024/0231099 A1 | 7/2024 | Danziger et al. | |

* cited by examiner

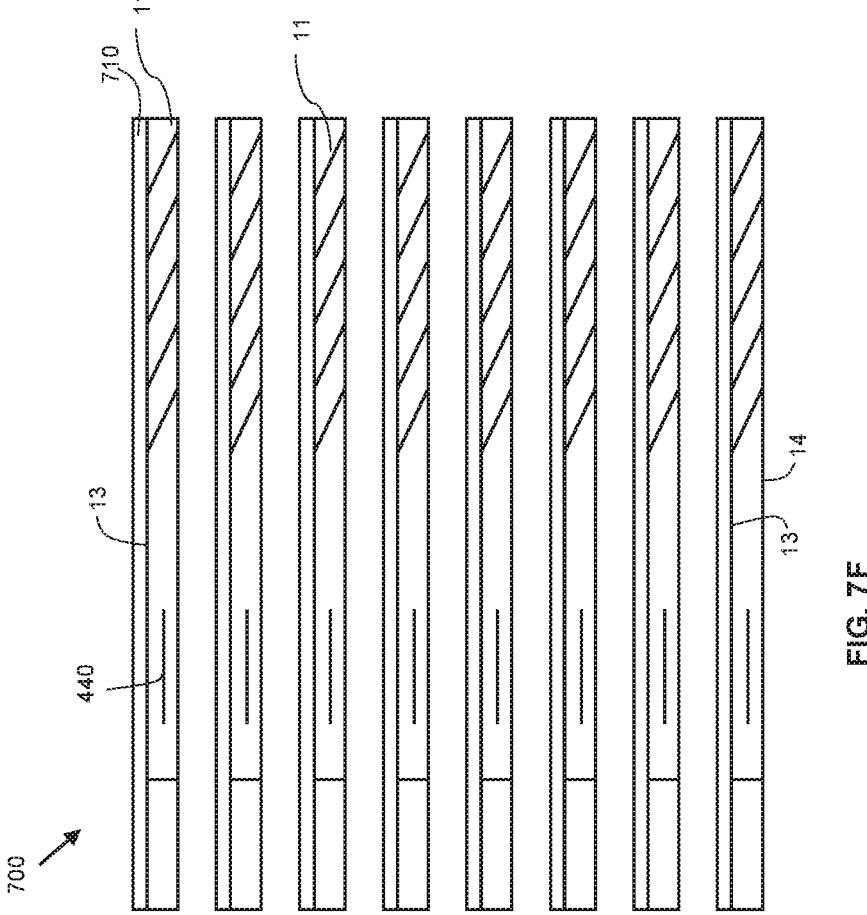
FIG. 7F
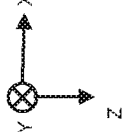

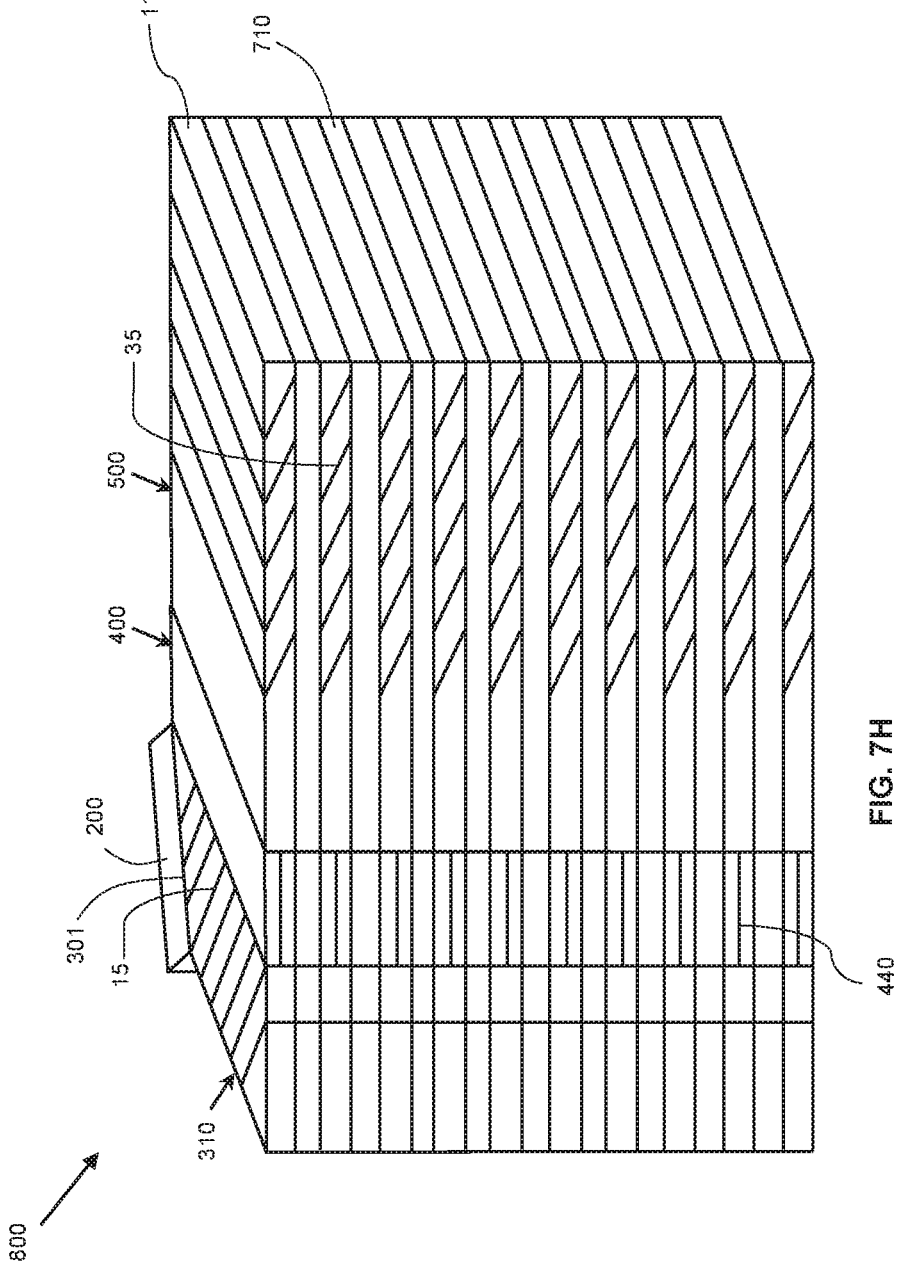
FIG. 7H
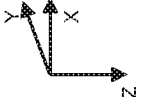

MANUFACTURING METHOD FOR A WAVEGUIDE

FIELD

This application is a national phase of International Application No. PCT/IB2024/050385, filed Jan. 15, 2024, which claims priority to U.S. Provisional Patent Application No. 63,439,127, filed Jan. 15, 2023, each of which is hereby incorporated herein by reference in its entirety.

BACKGROUND

Consumer demands for improved human-computer interfaces have led to an increased interest in high-quality image head-mounted displays (HMDs) or near-eye displays (NED), commonly known as smart glasses. These devices can provide virtual reality (VR) or augmented reality (AR) experiences, enhancing the way users interact with digital content and their surrounding environment.

Consumers are seeking better image quality, immersive experiences, and greater comfort when using HMDs. They expect displays with high resolution, vibrant colors, and minimal distortion to create a realistic and enjoyable viewing experience. Comfort is also a crucial factor since users often wear these devices for extended periods. Consumers desire lightweight, sleek designs that are less obtrusive and more convenient to wear in various scenarios. Smaller devices also offer improved portability, making them easier to carry and use in different environments. As such, there is a growing demand for higher performing yet smaller and more compact HMD.

A critical element in near-eye display systems is the waveguide. It is a device that guides light from a system image projector to the user's eyes. Waveguides rely on total internal reflection along the major surfaces within the device to propagate light. Improving the performance of miniaturized waveguides comes with certain challenges. As performance of waveguides is enhanced, the waveguides and their manufacturing processes become more complex. This complexity arises partly because features that boost performance also add to intricacy of the waveguide. Additionally, making waveguides smaller tends to complicate their production. Smaller components are harder to manage and to reproduce reliably. This increased complexity in manufacturing tends to lead to lower throughput and higher costs, which tends to lower adoption.

Therefore, there is a demand for innovative waveguide manufacturing processes that would reduce complexity in manufacturing while retaining or improving performance and compactness.

SUMMARY

The present disclosure is directed to a method of manufacturing waveguides for head mount displays. The novel method may include bonding a first set of waveguide elements with one or more adhesives sensitive to thermal or chemical removal and a second set of waveguide elements with one or more adhesives insensitive to thermal or chemical removal to form a waveguide stack, cutting the waveguide stack to form waveguide structures with embedded facets or diffractive elements, and removing portions corresponding to the first set of waveguide elements using a thermal or chemical removal while portions corresponding to the second set of waveguide elements remain bonded, forming the desired waveguide.

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

BRIEF DESCRIPTION OF THE DRAWINGS

FIGS. 7A to 7I illustrate a manufacturing method for a two-dimensional waveguide.

DETAILED DESCRIPTION

Figure 1A:
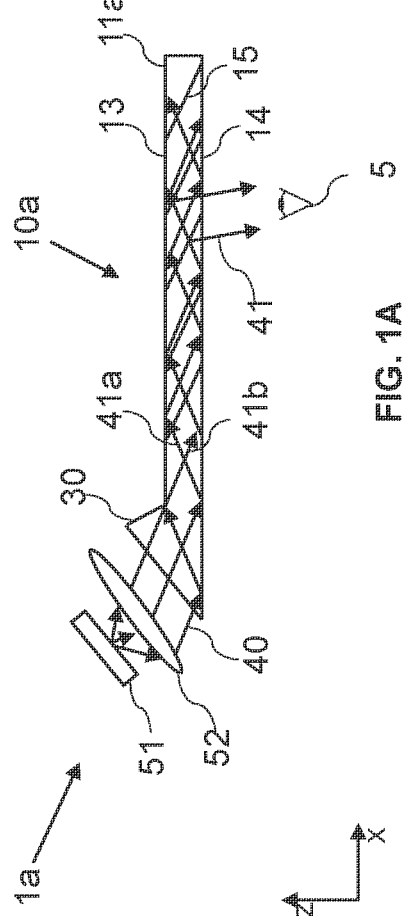
FIG. 1A illustrates a prior art waveguide system with reflective facets.

FIG. 1A illustrates a prior art waveguide system 1a including a projector 51, a collimating lens 52, and a waveguide system 10a. The waveguide system 10a includes a coupling-in prism 30, a waveguide substrate 11a having first and second major surfaces 13, 14, and partially reflecting surfaces or facets 15 disposed therein. In system 1a, the projector 51 projects light corresponding to an image to be collimated by the lens 52 before entering waveguide 10a through the coupling-in prism 30. Rays describing an exemplary field are shown in FIG. 1A. Collimated field rays 40 are coupled into the waveguide 11a such that an image 41a and a conjugated image 41b are trapped between the two major surfaces 13, 14 of the waveguide 11a by total internal reflection (TIR). The rays 41a and 41b propagate through waveguide 11a until they interact with one of the set of co-parallel partially reflective surfaces 15 embedded inside the waveguide substrate 11a. The embedded partially reflective surfaces 15 are coupling-out elements that couple the rays 41a, 41b out of the waveguide 11a as rays 42 and project the image onto the user's eye 5, which is located within a predetermined eye motion box.

Figure 1B:
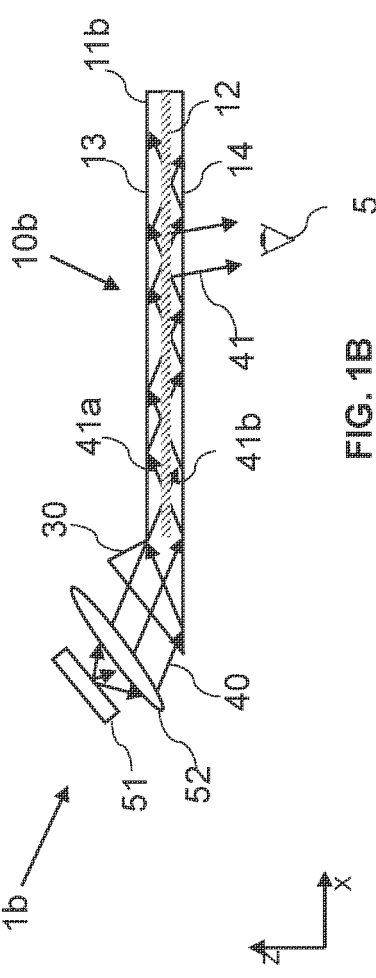
FIG. 1B illustrates a prior art waveguide system with refractive elements.

FIG. 1B illustrates a prior art alternative waveguide system 1b including a projector 51, a collimating lens 52, and a waveguide system 10b. The waveguide system 10b includes a coupling-in prism 30, a waveguide substrate 11b having first and second major surfaces 13, 14, and a diffractive element(s) 12 disposed therein. In system 1b, the projector 51 projects light corresponding to an image to be collimated by the lens 52 before entering the waveguide 10b through the coupling-in prism 30. Rays describing an exemplary field are shown in FIG. 1B. Collimated field rays 40 are coupled into the waveguide 11b such that an image 41a and a conjugated image 41b are trapped between the two major surfaces 13, 14 of the waveguide 11b by total internal reflection (TIR). The rays 41a and 41b propagate through waveguide 11b until they interact with the diffractive element(s) 12 embedded inside the waveguide substrate 11b. The embedded diffractive element(s) 12 are coupling-out elements that couple the rays 41a out of the waveguide to rays 42 and project the image onto the user's eye 5, which is located within a predetermined eye motion box.

Figure 1C:
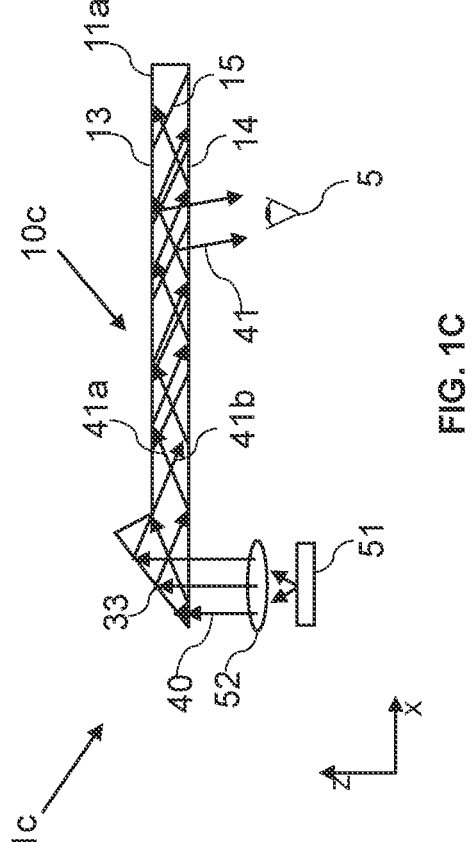
FIG. 1C illustrates a prior art waveguide system with reflective facets and a mirror input.
Figure 1D:
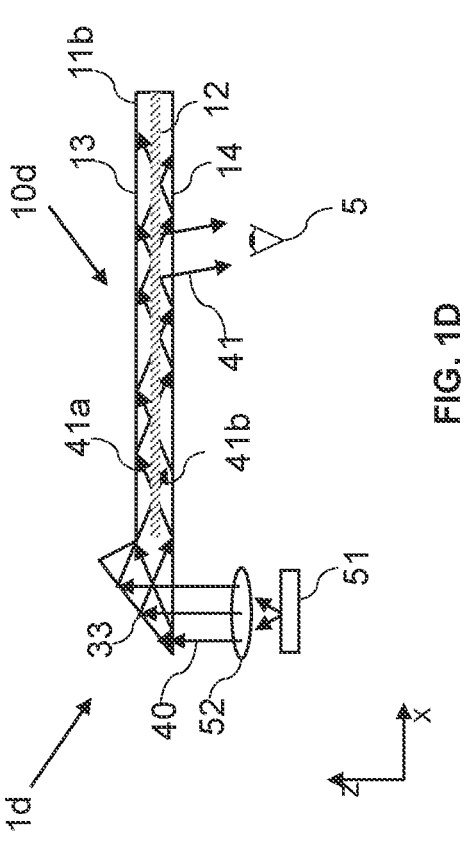
FIG. 1D illustrates a prior art waveguide system with refractive elements and a mirror input.

To minimize the size of the underlying near eye display, it is often desired to place the projector in a specific position relative to the waveguide as shown in FIGS. 1C and 1D. This can be achieved by coating the coupling-in prism 33 with a reflective coating and arranging the elements as shown.

FIG. 1C illustrates a prior art waveguide system 1c including a projector 51, a collimating lens 52, and a waveguide system 10c. The waveguide system 10c includes the coupling-in prism 33, a waveguide substrate 11a having first and second major surfaces 13, 14, and partially reflecting surfaces or facets 15 disposed therein. In system 1c, the projector 51 projects light corresponding to an image to be collimated by lens 52 before being reflected into the waveguide 10c by the coupling-in prism 33. Rays describing an exemplary field are shown in FIG. 1C. Collimated field rays 40 are coupled into the waveguide 11a such that an image 41a and a conjugated image 41b are trapped between the two major surfaces 13, 14 of the waveguide 11a by total internal reflection (TIR). The rays 41a and 41b propagate through waveguide 11a until they interact with one of the set of co-parallel partially reflective surfaces 15 embedded inside the waveguide substrate 11a. The embedded partially reflective surfaces 15 are coupling-out elements that couple the rays 41a, 41b out of the waveguide 11a as rays 42 and project the image onto the user's eye 5, which is located within a predetermined eye motion box.

FIG. 1D illustrates a prior art alternative waveguide system 1d including a projector 51, a collimating lens 52, and a waveguide system 10d. The waveguide system 10d includes a coupling-in prism 33, a waveguide substrate 11b having first and second major surfaces 13, 14, and a diffractive element(s) 12 disposed therein. In system 1d, the projector 51 projects light corresponding to an image to be collimated by the lens 52 before being reflected into the waveguide 10d by the coupling-in prism 33. Rays describing an exemplary field are shown in FIG. 1D. Collimated field rays 40 are coupled into the waveguide 11b such that an image 41a and a conjugated image 41b are trapped between the two major surfaces 13, 14 of the waveguide 11b by total internal reflection (TIR). The rays 41a and 41b propagate through waveguide 11b until they interact with the diffractive element(s) 12 embedded inside the waveguide substrate 11b. The embedded diffractive element(s) 12 are coupling-out elements that couple the rays 41a out of the waveguide to rays 42 and project the image onto the user's eye 5, which is located within a predetermined eye motion box.

FIGS. 1A-1D show simple cases where only a single set of embedded coupling-out elements 15 is used. However, more advanced structures with several sets of coupling-out elements can also be used. Examples of such advanced structures are shown in FIGS. 2A and 2B.

Figure 2A:
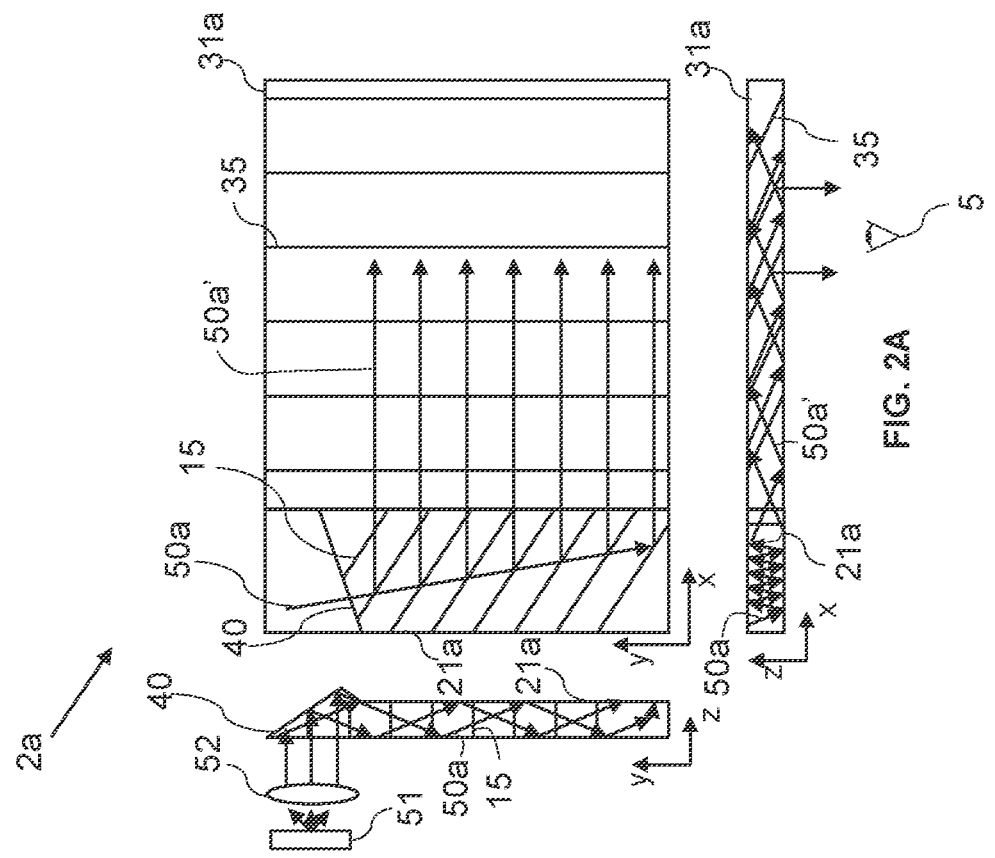
FIG. 2A illustrates a prior art two-dimensional waveguide system with reflective facets.

FIG. 2A shows configuration 2a as viewed from three different directions (x-y plane, x-z plane and y-z plane), where two sets of co-parallel partially reflective surfaces or facets 15, 35 are used, each set embedded in a respective waveguide substrate 21a, 31a, which have mutual co-parallel major surfaces. Light is coupled into waveguide part 21a by prism 40 and is trapped in the waveguide 21a by TIR and propagates according to ray 50a until it interacts with the facets 15 and is redirected in a direction 50a'. The light then propagates in waveguide 31a by TIR until it interacts with facets 35 and is coupled out of the waveguide part 31a and onto the user's eye 5.

Figure 2B:
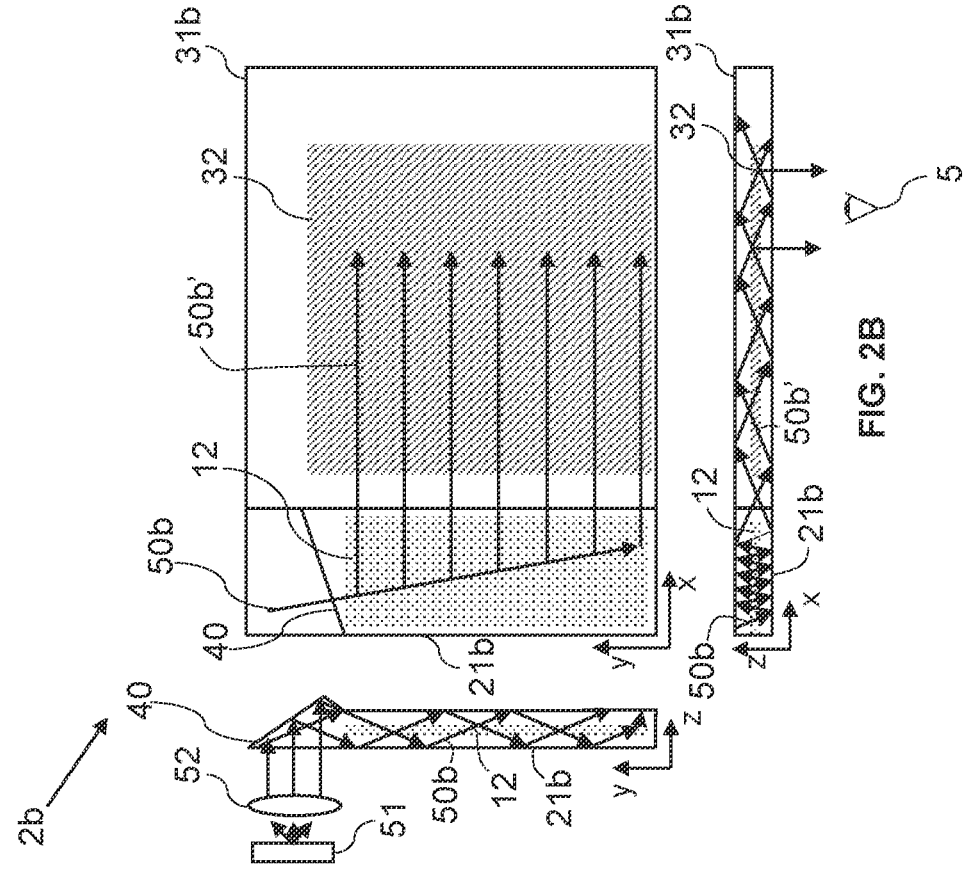
FIG. 2B illustrates a prior art two-dimensional waveguide system with refractive elements.

FIG. 2B shows configuration 2b as viewed from three different directions (x-y plane, x-z plane and y-z plane), where two sets of diffractive element(s) 12, 32 are used, each set embedded in a respective waveguide substrate 21b, 31b, which have mutual co-parallel major surfaces. Light is coupled into waveguide part 21b by the prism 40 and is trapped in the waveguide 21b by TIR and propagates according to ray 50b until it interacts with the element(s) 12 and is redirected in a direction 50b'. The light then propagates in waveguide 31b by TIR until it interacts with element(s) 32 and is coupled out of the waveguide part 31b and onto the user's eye 5.

With reference to WO2021/152602, which is hereby incorporated herein by reference in its entirety, described is a method for manufacturing the structures 1a, 1b, 2a, and 2b including coupling-in elements. The basic concept is based on adhesives that are sensitive to heating of a chemical reaction or material, and that can therefore be easily removed without harming the bonded optical components. The method is described below in the context of configurations having reflective elements (e.g., configurations 1c and 2a), but the method applies also to waveguides based on diffractive elements or a combination of reflective and diffractive elements.

Heating for removing adhesives involves applying heat to an adhesive bond to soften or melt the adhesive, making it easier to remove. Heating in the context of this disclosure may involve, but is not limited to, placing the bonded structure in a heating chamber (i.e., an oven). This method is particularly useful for adhesives that have high thermal sensitivity or lose their adhesive properties at elevated temperatures. Examples of adhesives that are susceptible to heating as a means of breaking the bond include UV-curable adhesives such as, for example, Loctite 3492 and Dymax OP-24, cyanoacrylate adhesives such as, for example, Loctite 401 and Permabond 910, acrylic adhesives such as, for example, 3M DP810 and Loctite 315 (Note: Some acrylic adhesives may have moderate temperature resistance, but they generally are less tolerant to high temperatures compared to silicones or certain epoxies.) In contrast, some adhesives are designed to withstand higher temperatures, making them suitable to remain strongly bonded even when exposed to high temperatures. Examples of adhesives that are not susceptible to heating as a means of breaking the bond include epoxy adhesives such as, for example, EPO-TEK 301 and Araldite 2021, and silicone adhesives such as, for example, Dow Corning 3145 RTV and Momentive TSE392-C.

Chemical etching for removing adhesives involves using a chemical solution to break down the adhesive's bonds, either through dissolving them or by weakening their structure so that they can be easily wiped or rinsed away. This process is particularly useful when mechanical removal methods (like scraping or peeling) are impractical or could damage the bonded surface. The choice of chemical used in chemical etching depends on the type of adhesive and the material of the waveguide elements involved. Example chemicals that may be used for etching include acetone (effective on many types of adhesives, particularly for acrylic and some epoxy and cyanoacrylate adhesives), iso-propyl alcohol (IPA) (good for less aggressive adhesive removal), and specialized adhesive removers (these are formulated to tackle specific types of adhesives without damaging the underlying material). The chemical may be applied to the adhesive using a brush, cloth, or by immersing the object in a chemical bath, depending on the size of the area and the type of adhesive. The reaction time the chemical needs to interact with the adhesive may vary from a few minutes to several hours, depending on the adhesive's strength and the chemical used. These chemicals work by weakening or dissolving the molecular bonds that make up the adhesive. This process can cause the adhesive to swell, soften, or disintegrate, making it easier to remove. Once the adhesive is sufficiently broken down, it can be wiped, scraped, or rinsed off the surface of the waveguide element. In some cases, a gentle scrubbing might be necessary to remove all residues. After removal of the adhesive, the surface may be rinsed to remove any remaining chemical residue. The surface is then allowed to dry.

Certain adhesives used for optical glass applications can be more susceptible to chemical etching than others, espe-cially when it comes to their removal. Examples of adhe-sives susceptible to chemical etching as a means for removal include acrylic-based adhesives (typically susceptible to solvents like acetone or isopropyl alcohol (IPA)) such as, for example, 3M DP810 and Loctite 315, cyanoacrylate adhe-sives (typically also removable with acetone) such as, for example, Loctite 401 and Permabond 910, UV-curable adhe-sives (certain formulations can be susceptible to specific solvents like acetone or specialized adhesive removers) such as, for example, Loctite 3492 and Dymax OP-24, certain epoxy resins (some specific formulations, especially those not designed for high chemical resistance, can be softened or removed with specific solvents or chemical etchants) such as, for example, EPO-TEK 301 and Araldite 2021.

In contrast, some adhesives used for optical glass appli-cations are typically resistant to chemical etching and designed to provide a strong, durable bond and maintain their integrity even in the presence of solvents. Examples of adhesives resistant to chemical etching include high-perfor-mance epoxy resins such as, for example, EPO-TEK 353ND and Master Bond EP30-2, silicone adhesives such as, for example, Dow Corning 3145 RTV and Momentive RTV108, modified acrylics such as, for example, 3M Scotch-Weld AC77 and Loctite 3301 Light Cure Adhesive, specialty UV-curable adhesives such as, for example, Norland Optical Adhesive 61 and Dymax 3099.

"Chemical etching" in this context may also include water dissolution. Certain adhesives may be used for optical glass applications and can be more susceptible to water dissolu-tion than others, especially when it comes to their removal. Examples of adhesives susceptible to chemical etching in the form of water dissolution as a means for removal include water-soluble gums and resins such as, for example, gum arabic and dextrin-based adhesives, polyvinyl alcohol (PVA) based adhesives such as, for example, Elmer's glue and bookbinder's PVA, cellulose ethers such as, for example, methylcellulose, specialty removable adhesives such as, for example, 3M Removable Repositionable Tape 665 (while not a traditional adhesive in liquid form, this tape uses a water-soluble adhesive that can be used for temporary positioning of optical components), and hydroxypropyl cel-lulose (HPC) such as, for example, Klucel™ G.

Accordingly, adhesives may be used in pairs or sets. A second member of the pair or set is more susceptible to removal than the first member of the pair or set. This way, a stack including elements bonded using the first member adhesive may remain bonded while elements bonded using the second member adhesive may be removed by exposing the stack to the removal conditions (e.g., chemical etching (including water dissolution), heating, etc.) The adhesives may be characterized as pertaining to a first group which are less susceptible to removal by chemical etching or heating than their counterpart in a second group which are more susceptible to removal by chemical etching or heating, as described above.

A method of manufacturing waveguides for head mount displays may include bonding a first set of waveguide elements with one or more adhesives from the first group (adhesives insensitive to thermal or chemical removal) and bonding a second set of waveguide elements with one or more adhesives from the second group (adhesives sensitive to thermal or chemical removal) to form a waveguide stack. The waveguide stack may then be cut to form waveguide structures with embedded facets or diffractive elements. Portions corresponding to the second set of waveguide elements (bonded using removal sensitive adhesives) may be removed from the waveguide structures using a thermal or chemical removal, leaving behind only the desired first set of waveguide elements.

FIGS. 3A through 3E illustrate manufacture of a wave-guide stack 100.

Figure 3B:
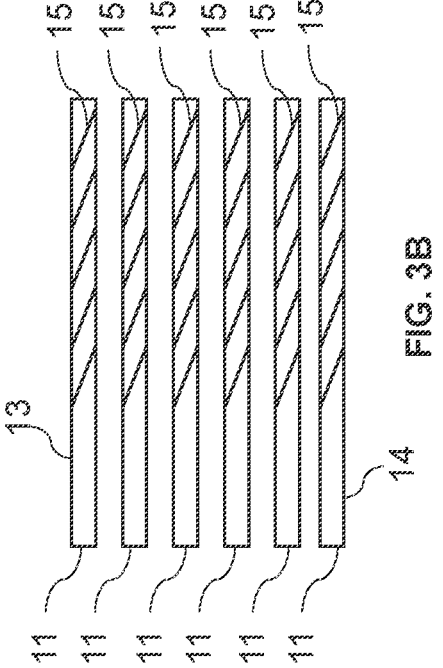
FIGS. 3A to 3E illustrate a manufacturing method for a waveguide stack.
Figure 3A:
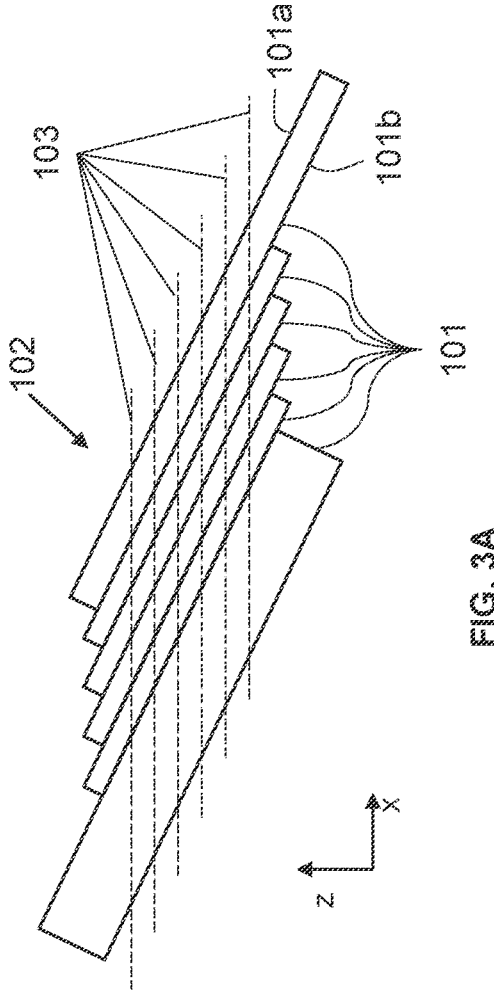

In FIG. 3A, plates 101 are treated (e.g., coated) to make their top or bottom surfaces 101*a*, 101*b* partially reflective or diffractive. The plates 101 are then bonded together at the top or bottom surfaces 101*a*, 101*b* to form a waveguide block 102 as shown in FIG. 3A. The plates 101 are bonded to each other using an adhesive selected from the first group of adhesives (i.e., adhesives insensitive to thermal or chemi-cal removal). The waveguide block 102 may then be cut along planes 103 at acute angles relative to the top and bottom surfaces 101*a*, 101*b*. As shown in FIG. 3B, the resulting waveguide slices 11 (similar to the waveguide structure 11*a* of FIG. 1C) each has a top surface 13, a bottom surface 14, and internal facets 15. The resulting slices may also be cut along planes perpendicular to planes 103 to result in the cuboid shape shown in FIG. 3B.

Figures 3C, 3D:
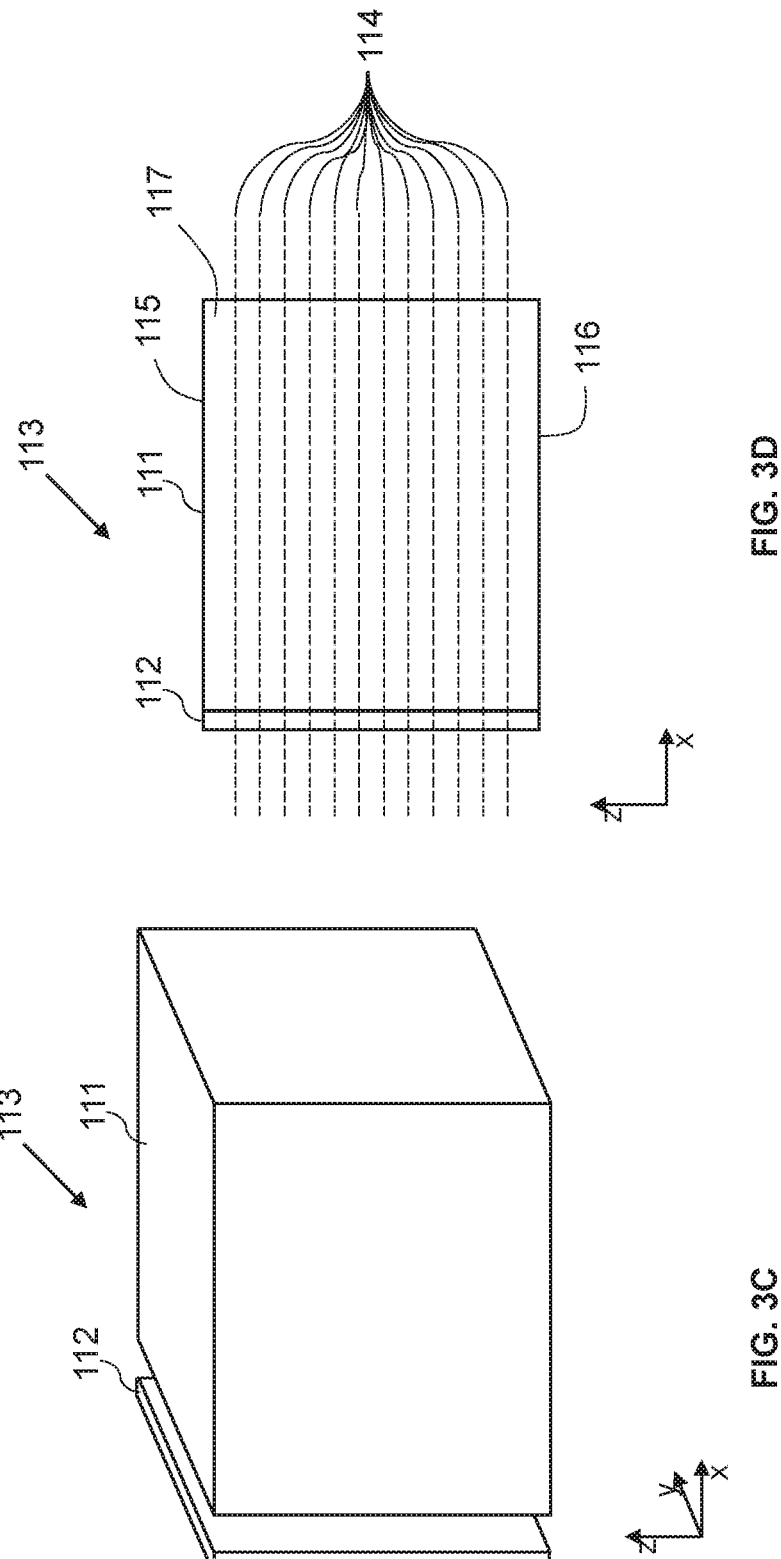

In FIGS. 3C-3D a block 111 and a plate 112 may be bonded together using an adhesive selected from the second group of adhesives (i.e., adhesives sensitive to thermal or chemical removal) to form a second block 113 having top and bottom surfaces 115, 116. Plate 112 may be selected to be relatively thin to minimize a portion of plate 112 that may remain with the final waveguide or that may need to be polished off the final waveguide. The second block 113 may then be cut along planes 114 (e.g., parallel to the top and bottom surfaces 115, 116) to form placeholder slices 117.

Figure 3E:
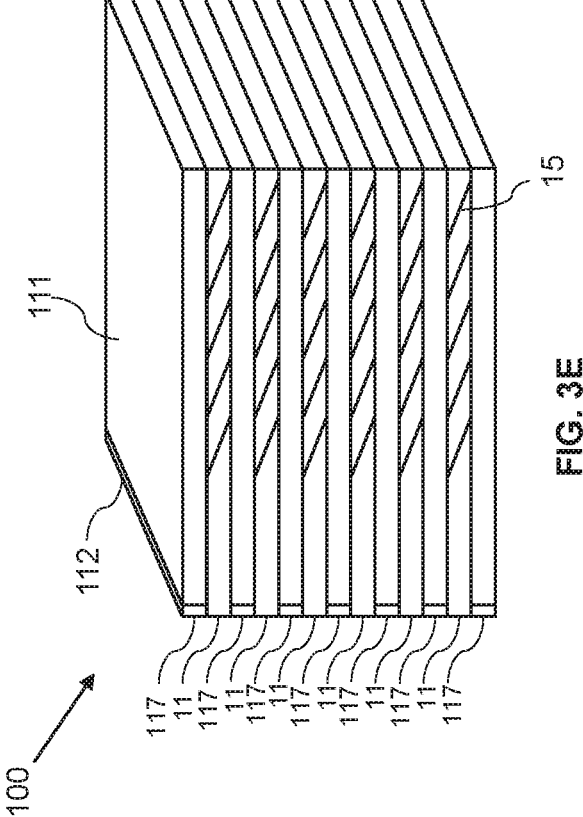
Figure 3E:
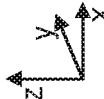

In FIG. 3E the waveguide slices 11 and the placeholder slices 117 are alternated and bonded together to form an intermediate waveguide stack 100. The waveguide slices 11 and the placeholder slices 117 are bonded using an adhesive selected from the second group (i.e., an adhesive sensitive to chemical etching or heating removal) and can, therefore, be later easily removed and detached from each other.

Figures 4A, 4B:
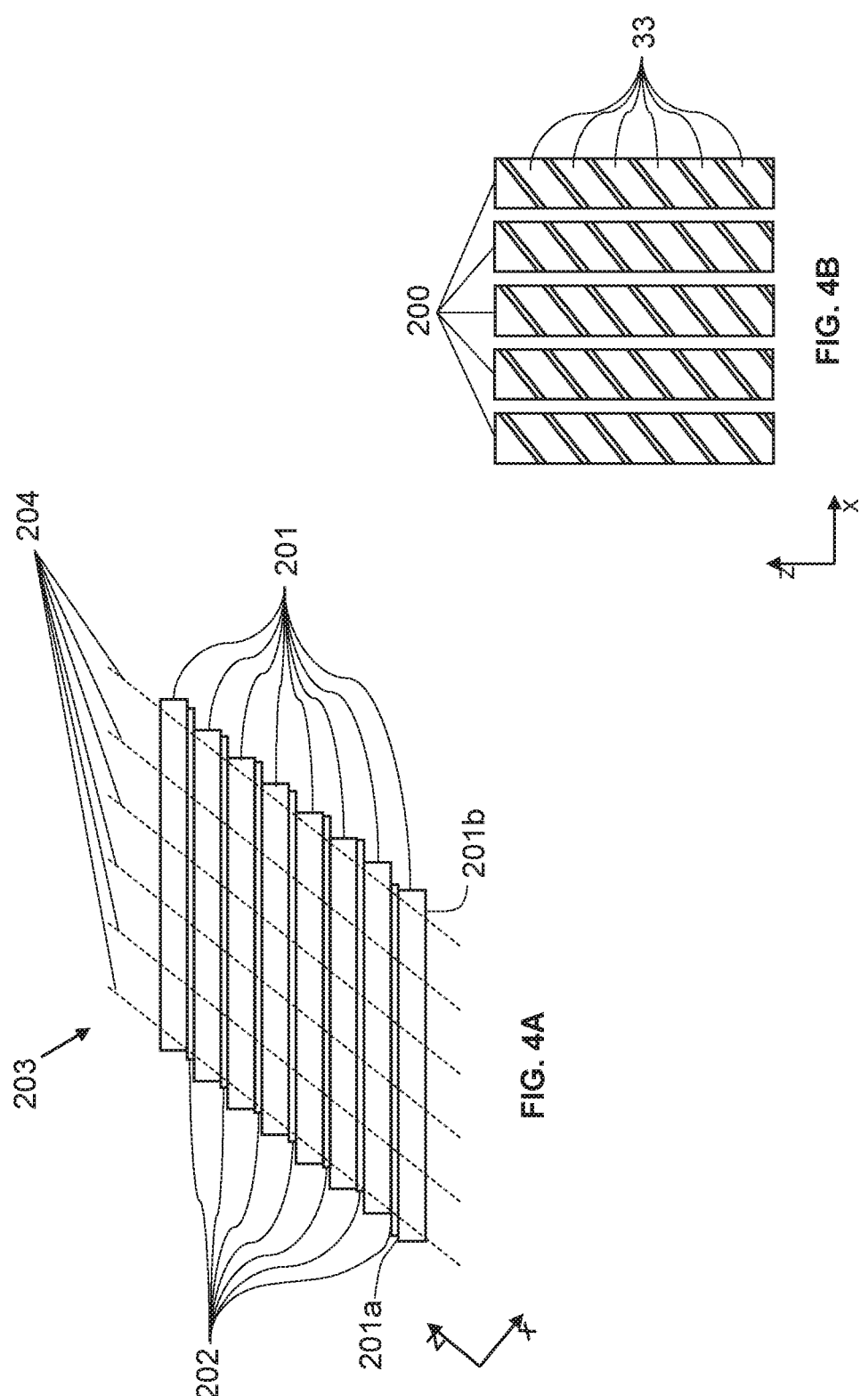
FIGS. 4A and 4B illustrate a manufacturing method for mirror coupling-in segments.

FIGS. 4A and 4B illustrate manufacture of mirror cou-pling-in segments 200.

In FIG. 4A, coupling-in plates 201 are treated (e.g., coated) to make their top surfaces 201*a* reflective or diffractive to act like a mirror. The top (i.e., mirror) surfaces 201*a* of the coupling-in plates 201 may then be bonded to first surfaces of sacrificial plates 202 and the bottom surfaces 201*b* of the coupling-in plates 201 may be bonded to second surfaces of the sacrificial plates 202 to form a coupling-in stack 203 having top and bottom surfaces 201*a*, 201*b*. To allow for later removal of the sacrificial plate portions, one or both of the bonding of the top (i.e., mirror) surfaces 201*a* of the coupling-in plates 201 to the first surfaces of the sacrificial plates 202 or the bonding of the bottom surfaces 201*b* of the coupling-in plates 201 to the second surfaces of the sacrificial plates 202 may be done using an adhesive selected from the second group of adhesives (i.e., an adhesive sensitive to chemical etching or heating removal). In another embodiment, the coupling-in plates 201 may be bonded to each other using an adhesive selected from the second group of adhesives (i.e., an adhesive sensitive to chemical etching or heating removal) to form the coupling-in stack 203. The coupling-in stack 203 may then be cut along planes 204 at acute angles relative to the top and bottom surfaces 201, 201*b*. As shown in FIG. 4B, the resulting coupling-in stack segments 200 each includes multiple coupling-in plane segments that will become the prisms 33.

Figures 5A, 5B:
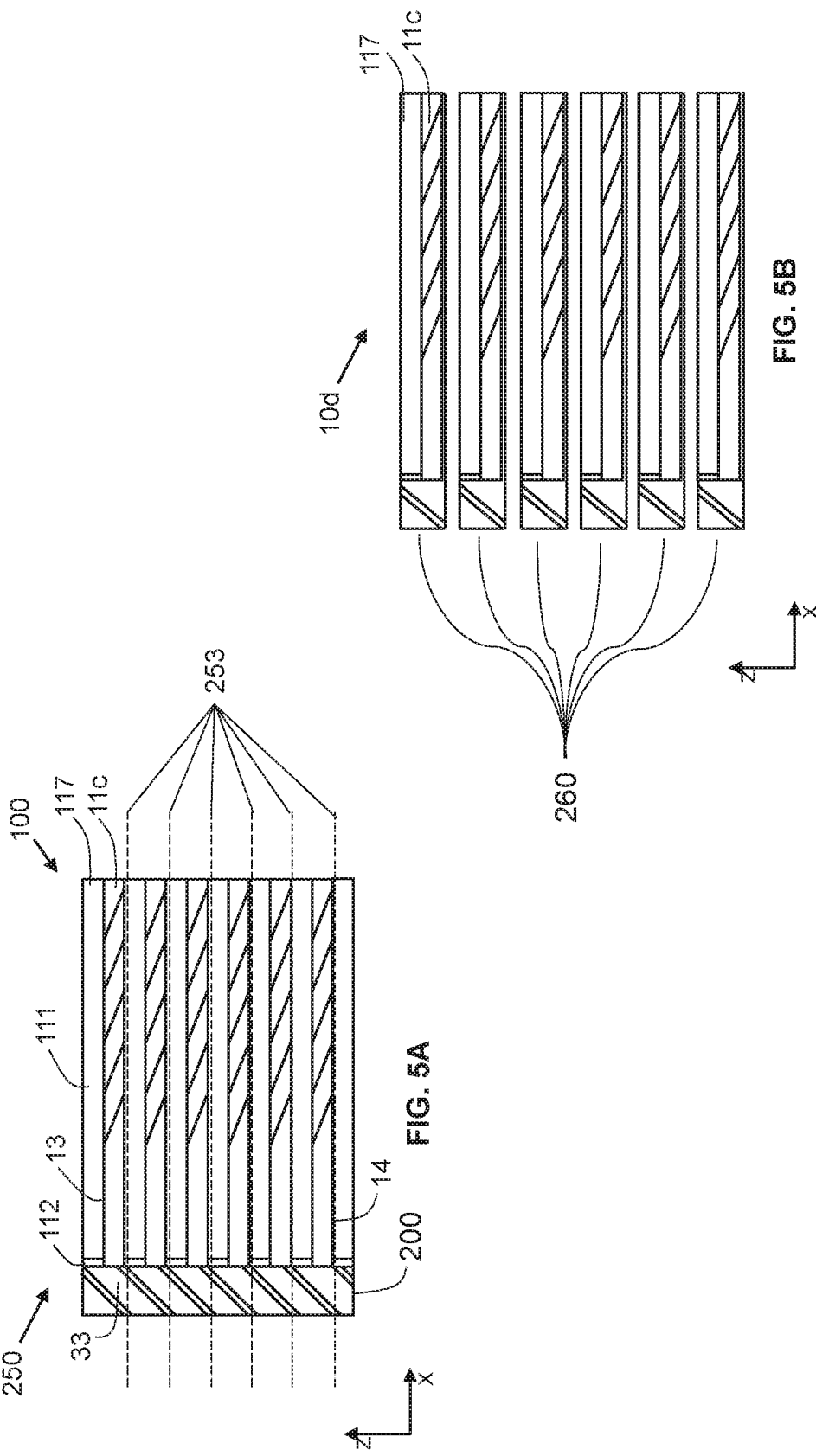
FIGS. 5A to 5C illustrate a manufacturing method for a waveguide.
Figures 5C, 6:
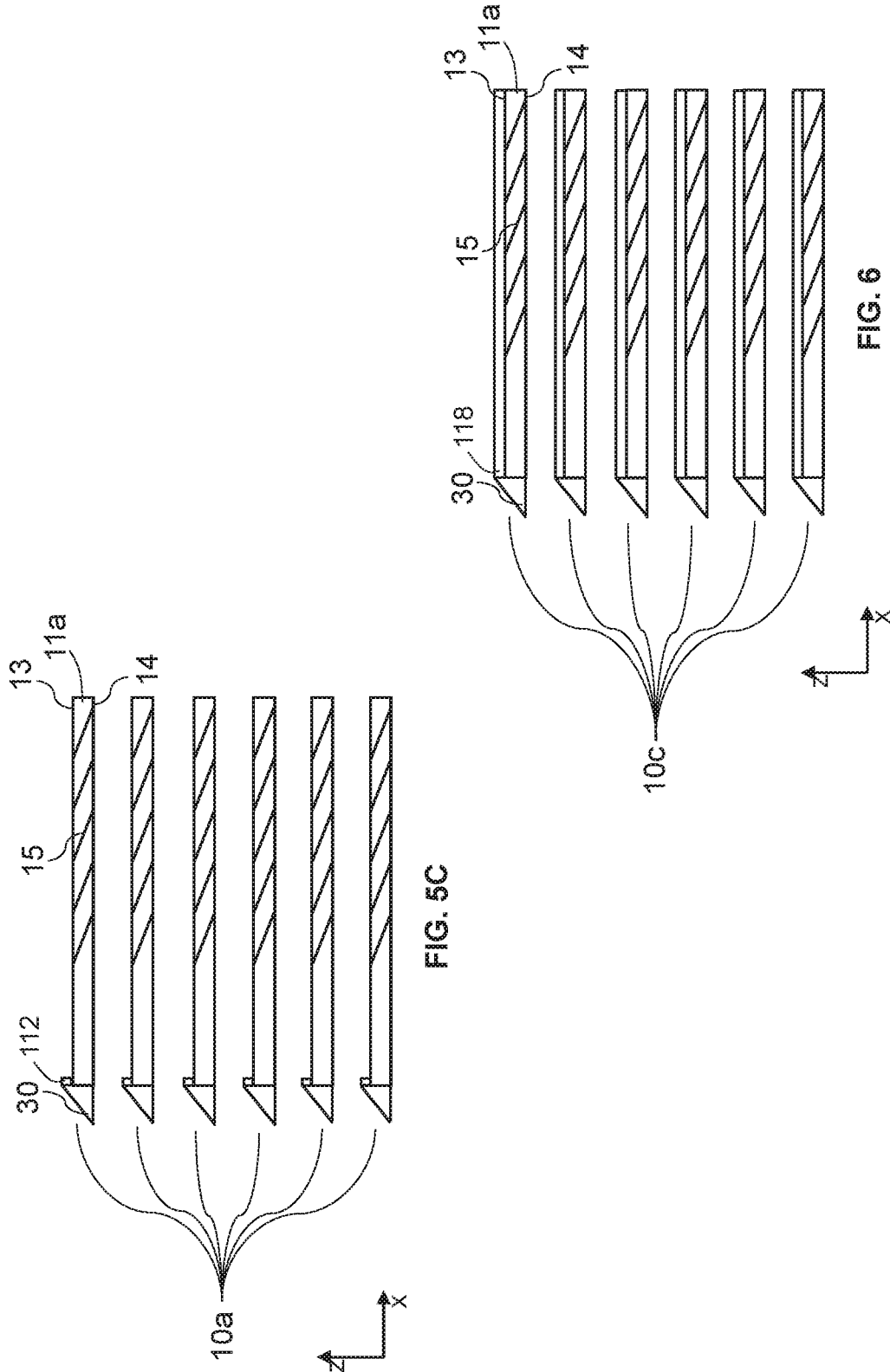
FIG. 6 illustrates an alternative manufacturing method for a waveguide.

FIGS. 5A through 5C illustrate manufacture of waveguide 10, similar to the waveguide 10*c* described above.

In FIG. 5A, a waveguide stack 100 is bonded to a coupling-in stack segment 200 to form a waveguide structure 250. Specifically, the coupling-in plane segments 33 in the coupling-in stack segments 200 are aligned with and bonded to respective waveguide slices 11 in the waveguide stack 100 using an adhesive selected from the first group of adhesives (i.e., an adhesive insensitive to chemical etching or heating removal). The coupling-in plane segments 33 may also permanently bonded to the placeholder plate portion 112 of the plateholder slices 117, but the majority of the placeholder material will be removed in the form of the placeholder block portion 111. The waveguide structure 250 may then be cut along planes 253 which approximately continue bottom surfaces 14. The planes 253 are thus substantially parallel to the top and bottom surfaces 13, 14 to form waveguide structure segments 260 as shown in FIG. 5B.

In FIG. 5C, portions corresponding to the placeholder slices 117 and the sacrificial plates 202 (i.e., any portions bonded using an adhesive selected from the second group of adhesives) have been removed by chemical etching or heating from segments 260 to arrive at waveguides 10*c*. Any remaining undesired material such as the remaining portion of plate 112 may be left in place as its relatively small size will not significantly affect performance of the resulting waveguide 10*c*. Alternatively, the undesired material may be polished, for example, in the process of polishing the bottom surface 14 of the waveguide 11*c*. Since the size of this portion 112 is not very large as compared to the entire waveguide, the major surface 14 of the waveguide 11*c* dominates the polishing process and the major surface 14 will be uniform and co-parallel to the top major surface 13 with high accuracy.

FIG. 6 illustrates an alternative embodiment to the embodiment of FIGS. 5A through 5C. In the arrangement of FIG. 6, the spacer slice 118 remains as part of the final waveguide 10*d*. If the spacer slice 118 is made to have co-parallel surfaces with very high accuracy, the bond between the spacer slice 118 and the waveguide 11*c* may be made with an adhesive in the first group (i.e., adhesive that is not sensitive to the removal process) that has a sufficiently low refractive index such light can be bounded (TIR) within the waveguide 11*c*. In this case, forming the spacer slice 118 from two different portions 111 and 112 (as placeholder slice 117 in FIG. 3C) is unnecessary because the spacer slice 118 remains whole in the final waveguide 10*d* and so may be made of a single portion.

The novel techniques disclosed herein may be applied to more advanced configurations as well, as demonstrated in FIG. 7A-I with reference to WO2023026266A1, which is hereby incorporated herein by reference in its entirety.

Figures 7A, 7B:
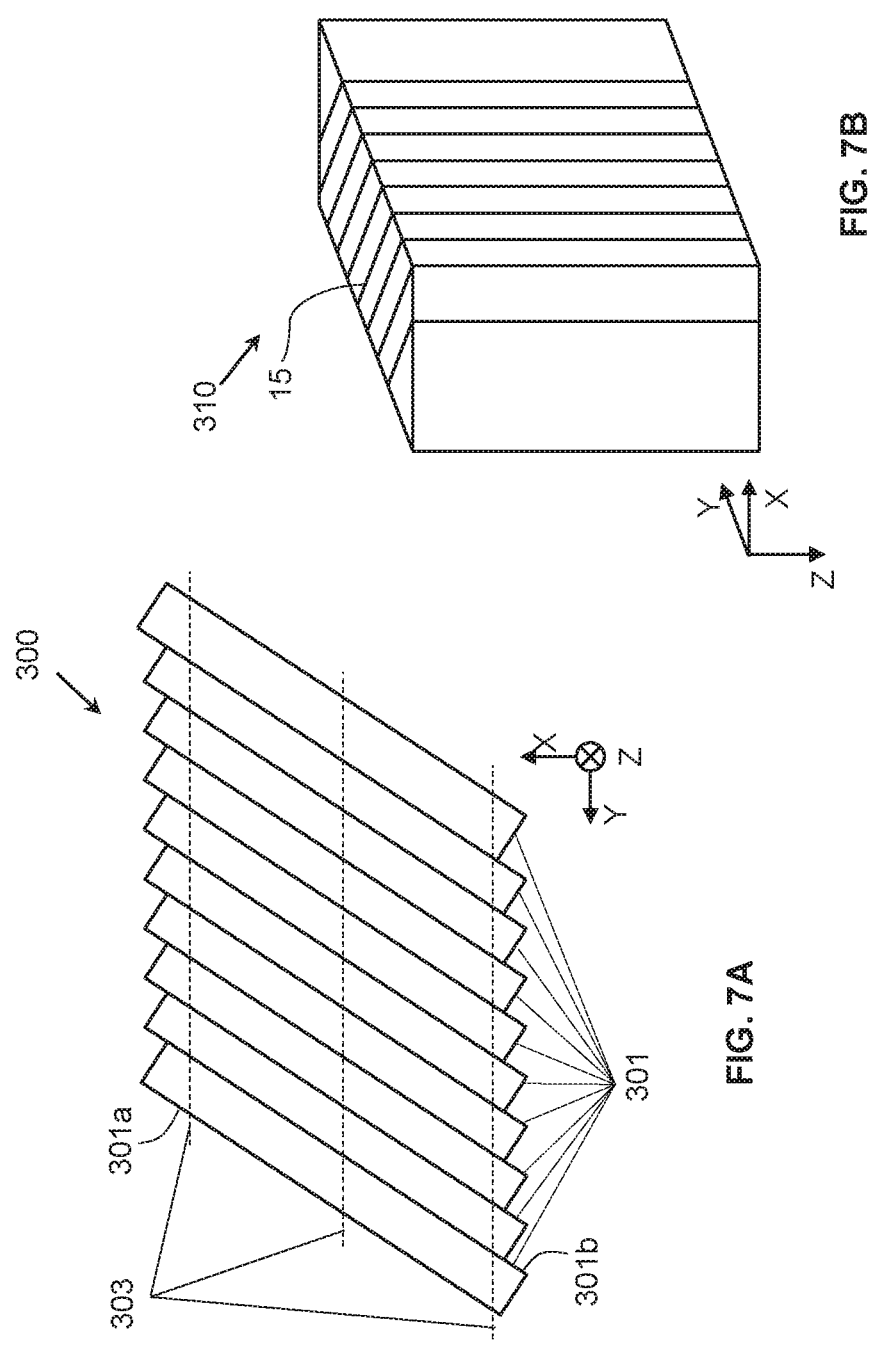

In FIG. 7A, the top or bottom surfaces 301*a*, 301*b* of first waveguide plates 301 are treated (e.g., coated) to make the top or the bottom surfaces 301*a*, 301*b* partially reflective or diffractive. The first waveguide plates 301 may then be bonded at the top or bottom surfaces 301*a*, 301*b* using an adhesive selected from a first group of adhesives (i.e., an adhesive insensitive to chemical etching or heating removal) to form a first waveguide block 300. The first waveguide block 300 may then be cut along first planes 303 at acute angles relative to the top and bottom surfaces 301*a*, 301*b*. The resulting one or more first waveguide block 310 have internal facets 15. The resulting one or more waveguide block 310 may also be cut along planes perpendicular to the planes 303 to result in the cuboid shape shown in FIG. 7B.

Figure 7C:
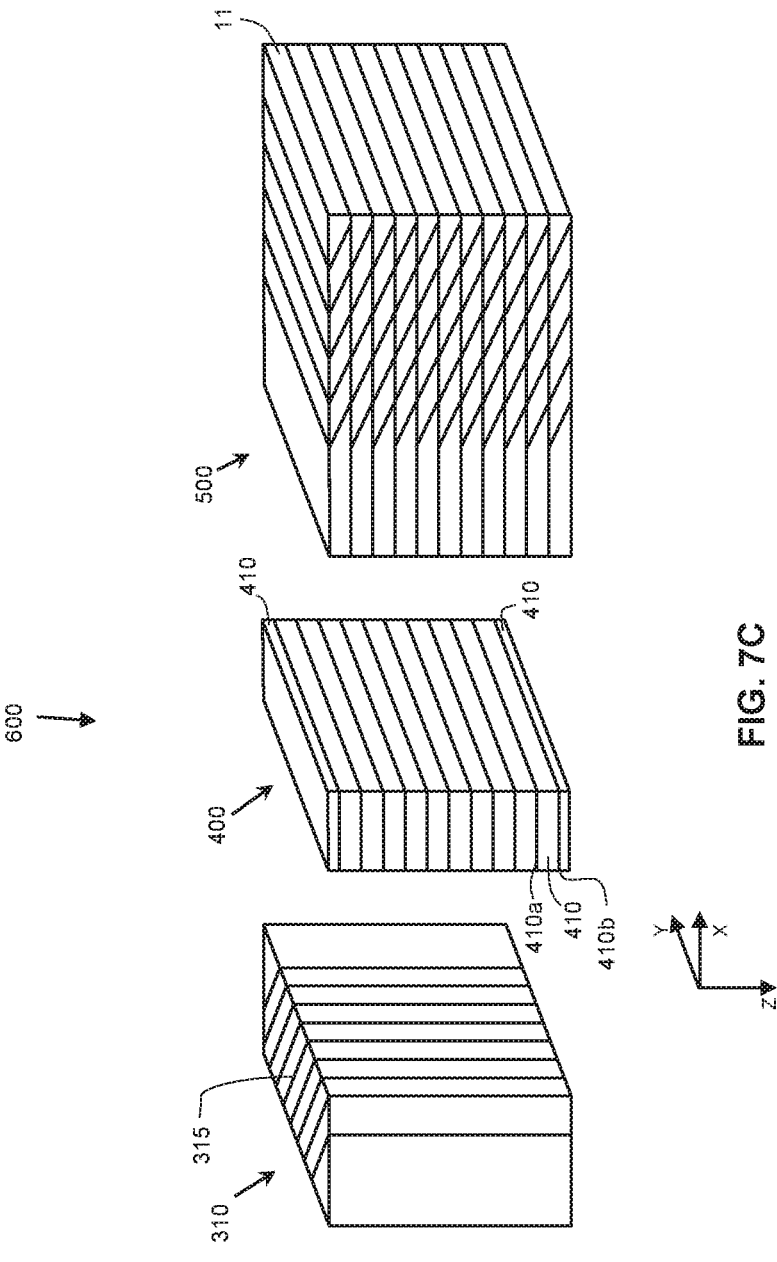

In FIG. 7C, waveguide slices 11 are constructed similarly to the description above in reference to FIGS. 3A and 3B and bonded together using an adhesive selected from the first group of adhesives (i.e., an adhesive insensitive to chemical etching or heating removal) to form a waveguide stack 500.

Top or bottom surfaces 41*a*, 41*b* of third waveguide plates 410 may be treated to make the top or the bottom surfaces 410*a*, 410*b* partially reflective or diffractive. In the illustrated embodiment of FIG. 7C, the top and bottom third waveguide plates 410 are half as thick as third waveguide plates 410 in between the top and bottom. The top and bottom third waveguide plates 410 may be premade to be thinner or, more practically, the top and bottom third waveguide plates become thinner when cut along planes 603 as described above in reference to FIG. 7E. The third waveguide plates 410 may then be bonded at the top or bottom surfaces 410*a*, 410*b* to form a mixer block 400 using an adhesive selected from the first group of adhesives (i.e., an adhesive insensitive to chemical etching or heating removal).

Figure 7D:
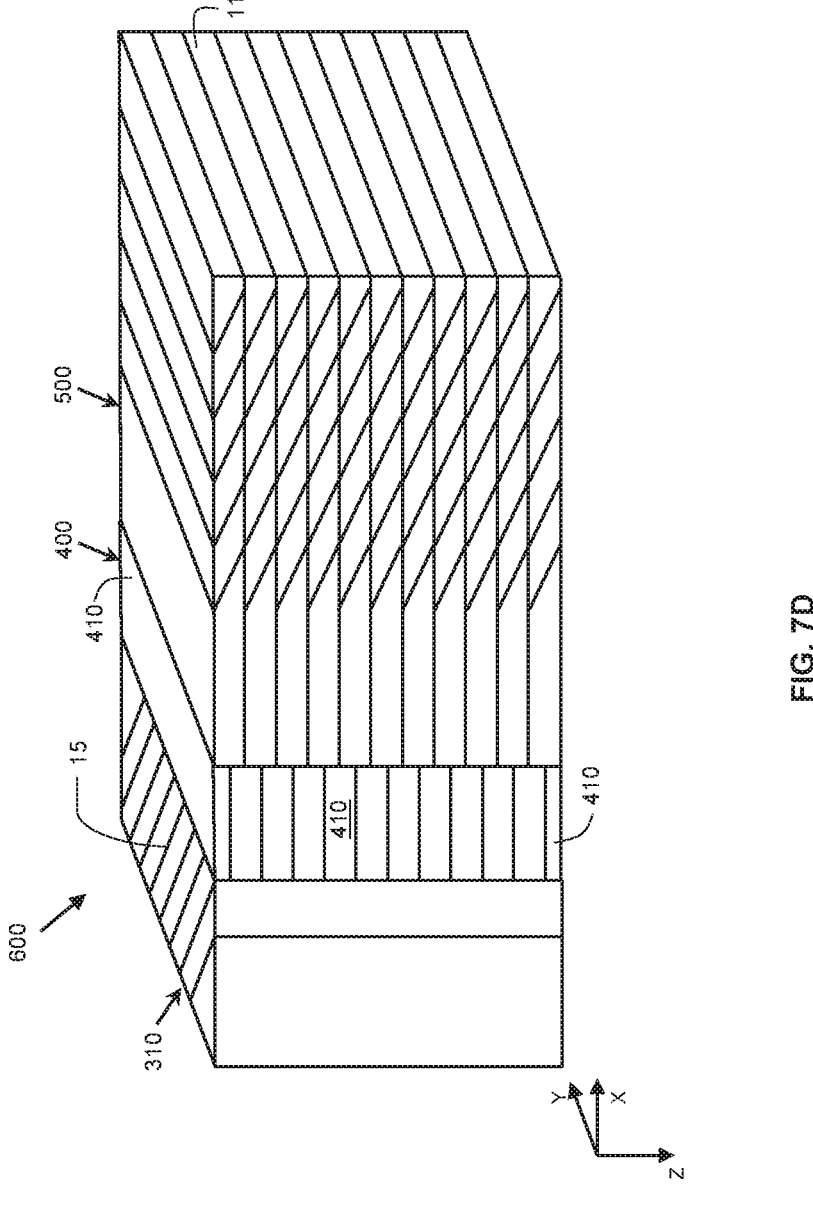
Figure 7E:
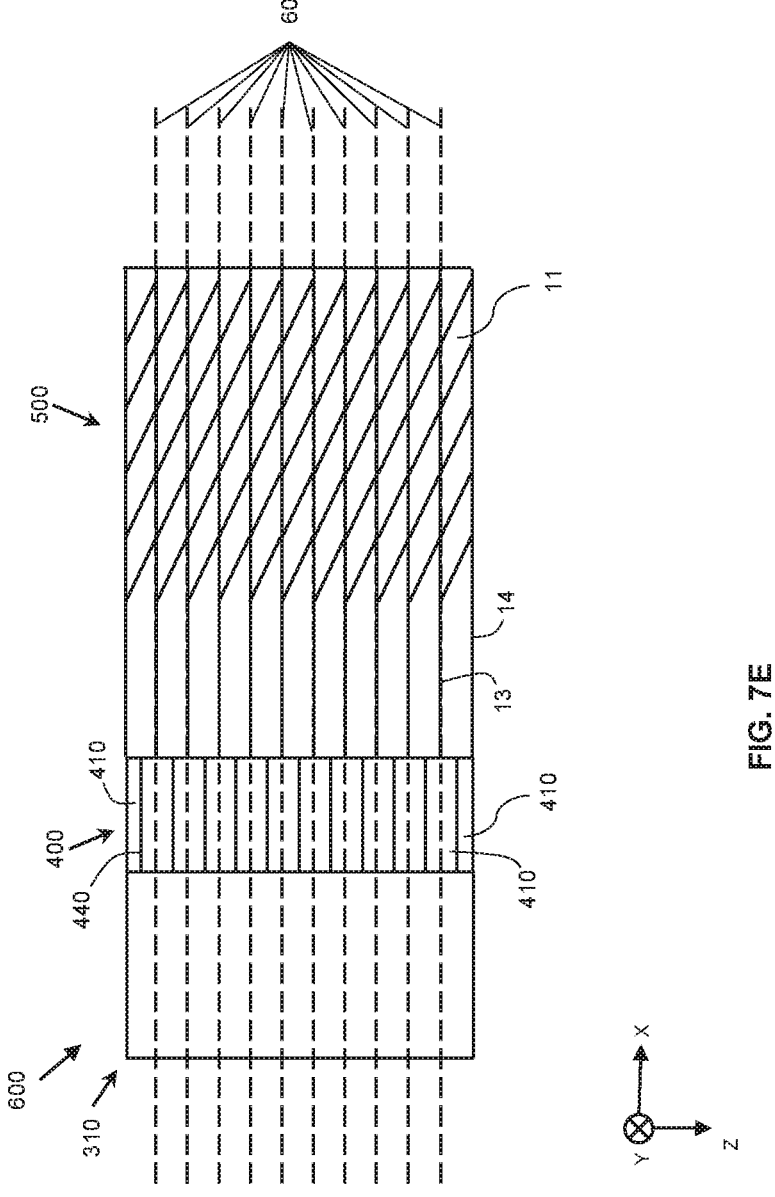

The first waveguide block 310 may be bonded to the mixer block 400 and the mixer block 400 bonded to the waveguide stack 500 to form a compound waveguide block 600 using an adhesive selected from the first group of adhesives (i.e., an adhesive insensitive to chemical etching or heating removal) as shown in FIG. 7D. As illustrated in FIG. 7E, the compound waveguide block 600 may then be cut along planes 603 corresponding to the top and bottom surfaces 13, 14 of the second waveguide slices 11 to form third waveguide slices as shown in FIG. 7F. The mixer block 400 aligns with the waveguide stack 500 such that, as shown in FIG. 7F, a mixer surface or homogenizer 440 appears embedded about half way (Z direction) in relation to the waveguide slices 11. In general, optical mixers or homogenizers such as the homogenizer 440 correspond to a symmetrical beam multiplier region that has n internal planar beam splitters (where n is a positive integer). Each beam splitter is internal to the resulting LOE 810 and parallel to the major surfaces 13, 14. Examples of optical mixers or homogenizers such as the homogenizer 440 are described in significant detail in, for example, U.S. patent application Ser. No. 17/420,675 (published as Pub. No. US 2022/0099885) to Ronen et al. Therefore, optical mixers such as the homogenizer 440 are not described in additional details here. The individual slices 11 may be fine-polished at this stage such that major surfaces 13 and 14 of each waveguide slice 11 are parallel to one another with high accuracy.

Next, as shown in FIG. 7F, the waveguide slices 11 may be bonded in a stack with alternating placeholder plates 710 using an adhesive selected from the second group (i.e., an adhesive sensitive to chemical etching or heating removal) to form a second waveguide stack 700. The second waveguide stack 700 may then be cut to form an aperture for the coupling-in stack segment 200.

Figure 7G:
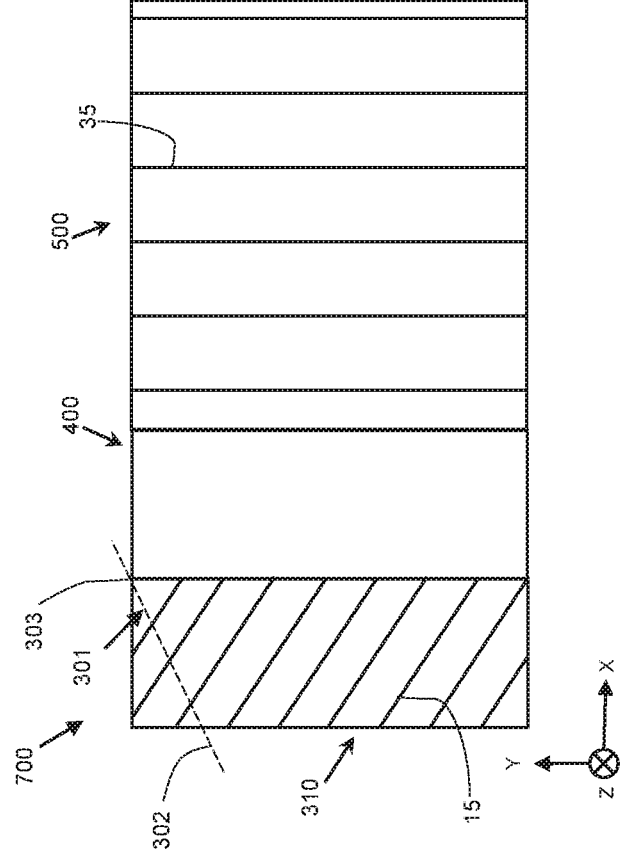

FIG. 7G illustrates a top view of the second waveguide stack 700 (i.e., view is rotated 90 degrees from the view of FIG. 7F). The first waveguide stack 310 of the stack 700 is cut along a plane 302 perpendicular to top and bottom surfaces 13, 14 of the third waveguide slices 11 and that intersects an edge 303 at which the first waveguide stack 310 joins the mixer block 400 to form an aperture surface 301 to which the coupling-in stack segment 200 may be bonded, as shown in FIG. 7H. The coupling-in stack segment 200 is bonded to the aperture surface 301 with an adhesive selected from the first group (i.e., an adhesive insensitive to chemical etching or heating removal) to form a third waveguide stack 800.

Figure 7I:
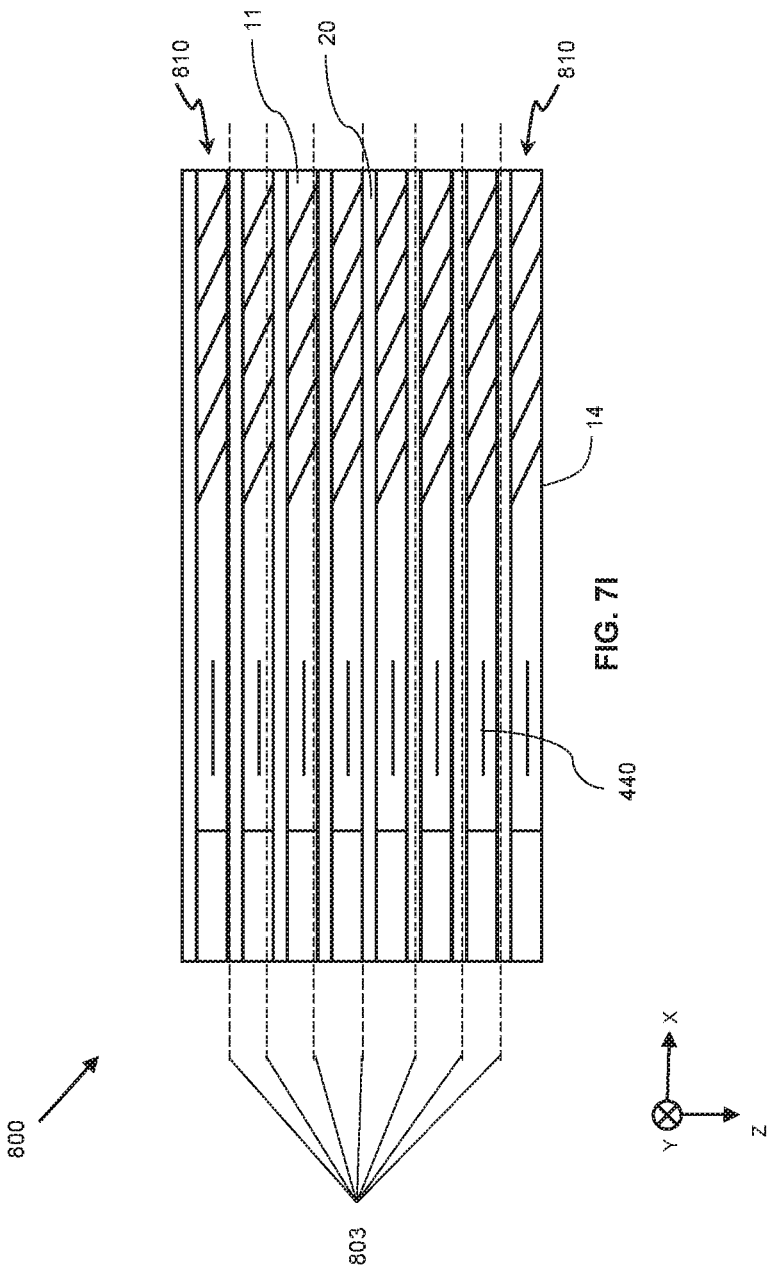

As shown in FIG. 7I, the waveguide stack 800 may be cut along planes 803 corresponding to the bottom surfaces 14 of the second waveguide slices 11 to form waveguide slices 810. Portions of the waveguide slices 810 corresponding to the placeholder plates 710 or the sacrificial plates 202 (i.e., any portions bonded using an adhesive selected from the second group of adhesives) may be removed by at least one of chemical etching or heating. The resulting waveguide structure corresponds to the structure 2a of FIG. 2A.

Definitions

The following includes definitions of selected terms employed herein. The definitions include various examples or forms of components that fall within the scope of a term and that may be used for implementation. The examples are not intended to be limiting. Both singular and plural forms of terms may be within the definitions.

An "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, etc. have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. A method for manufacturing a waveguide, the method comprising:
    treating top or bottom surfaces of waveguide plates to make the top or the bottom surfaces partially reflective or diffractive;
    bonding the waveguide plates at the top or bottom surfaces to form a waveguide block having top and bottom surfaces using an adhesive selected from a first group of adhesives;
    cutting the waveguide block along planes at acute angles relative to the top and bottom surfaces of the waveguide block to form waveguide slices with internal facets;
    bonding a first plate to a front surface of a first block to form a second block having top and bottom surfaces;
    cutting the second block to form placeholder slices; and
    alternating and bonding the waveguide slices to the placeholder slices using an adhesive selected from a second group of adhesives to form a waveguide stack,
    wherein the second group of adhesives consists of adhesives more susceptible to chemical etching or heating removal than respective adhesives in the first group of adhesives.

2. The method of claim 1, comprising:
    treating top surfaces of coupling-in plates to make the top surfaces of the coupling-in plates reflective or diffractive;
    bonding the coupling-in plates together using an adhesive selected from the second group of adhesives to form a coupling-in stack having top and bottom surfaces; and
    cutting the coupling-in stack along planes at acute angles relative to the top and bottom surfaces of the coupling-in stack to form one or more coupling-in stack segments including coupling-in plane segments.

3. The method of claim 1, comprising:
    treating top surfaces of coupling-in plates to make the top surfaces of the coupling-in plates reflective or diffractive;
    bonding the top surfaces of the coupling-in plates to first surfaces of sacrificial plates using an adhesive selected from the first group of adhesives and bonding bottom surfaces of the coupling-in plates to second surfaces of the sacrificial plates using an adhesive selected from the second group of adhesives to form a coupling-in stack having top and bottom surfaces; and
    cutting the coupling-in stack along planes at acute angles relative to the top and bottom surfaces of the coupling-in stack to form one or more coupling-in stack segments including coupling-in plane segments.

4. The method of claim 2, comprising:

bonding the coupling-in plane segments to respective waveguide slices in the waveguide stack using an adhesive selected from the first group of adhesives to form a waveguide structure.

5. The method of claim 4, comprising:

cutting the waveguide structure along planes parallel to top and bottom surfaces of the waveguide structure to form one or more waveguide structure segments.

6. The method of claim 5, comprising:

removing from one or more of the waveguide structure segments portions bonded using an adhesive selected from the second group of adhesives by at least one of chemical etching or heating.

7. The method of claim 3, comprising:

bonding the coupling-in plane segments to respective waveguide slices in the waveguide stack using an adhesive selected from the first group of adhesives to form a waveguide structure.

8. A method for manufacturing a waveguide, the method comprising:

producing a waveguide stack in which at least some elements are bonded using an adhesive selected from a first group of adhesives;

treating top surfaces of coupling-in plates to make the top surfaces of the coupling-in plates reflective or diffractive;

bonding the coupling-in plates together or bonding the coupling-in plates to sacrificial plates using an adhesive selected from the second group of adhesives to form a coupling-in stack having top and bottom surfaces;

cutting the coupling-in stack along planes at acute angles relative to the top and bottom surfaces of the coupling-in stack to form one or more coupling-in stack segments including coupling-in plane segments;

bonding the coupling-in plane segments to respective waveguide slices in the waveguide stack using an adhesive selected from the first group of adhesives to form a waveguide structure;

wherein the second group of adhesives consists of adhesives more susceptible to chemical etching or heating removal than respective adhesives in the first group of adhesives;

cutting the waveguide structure along planes parallel to top and bottom surfaces of the waveguide structure to form waveguide structure segments; and removing from one or more of the waveguide structure segments portions bonded using an adhesive selected from the second group of adhesives by at least one of chemical etching or heating.

9. The method of claim 8, wherein the producing the waveguide stack comprises:

treating top or bottom surfaces of waveguide plates to make the top or the bottom surfaces partially reflective or diffractive;

bonding the waveguide plates at the top or bottom surfaces to form a first block having top and bottom surfaces using the adhesive selected from a first group of adhesives;

cutting the first block along planes at acute angles relative to the top and bottom surfaces of the first block to form the waveguide slices with internal facets;

cutting a second block to form spacer slices; and alternating and bonding the waveguide slices to the spacer slices to form the waveguide stack.

10. The method of claim 9, comprising:

polishing the top and bottom surfaces of the waveguide slices including removing a portion of the first plate that remains adhered to the top surface.

11. A method for manufacturing a waveguide, the method comprising:

treating top or bottom surfaces of first waveguide plates to make the top or the bottom surfaces of the first waveguide plates partially reflective or diffractive;

bonding the first waveguide plates at the top or bottom surfaces to form a first waveguide block using an adhesive selected from a first group of adhesives;

cutting the first waveguide block along first planes at acute angles relative to the top and bottom surfaces to form one or more first waveguide slices with internal facets;

treating top or bottom surfaces of second waveguide plates to make the top or the bottom surfaces of the second waveguide plates partially reflective or diffractive;

bonding the second waveguide plates at the top or bottom surfaces to form a second waveguide block having top and bottom surfaces using an adhesive selected from the first group of adhesives;

cutting the second waveguide block along third planes at acute angles relative to the top and bottom surfaces of the second waveguide block to form one or more second waveguide slices with internal facets;

bonding the waveguide slices using an adhesive selected from the first group of adhesives to form a waveguide stack;

treating top or bottom surfaces of third waveguide plates to make the top or the bottom surfaces of the third waveguide plates partially reflective or diffractive;

bonding the third waveguide plates at the top or bottom surfaces to form a mixer block having top and bottom surfaces using an adhesive selected from the first group of adhesives;

bonding the at least one of the first waveguide slices to the mixer block and the mixer block to the waveguide stack to form a compound waveguide block;

cutting the compound waveguide block along planes corresponding to the top or bottom surfaces of the second waveguide slices to form third waveguide slices; and alternating and bonding the third waveguide slices to placeholder plates using an adhesive selected from a second group of adhesives to form a second waveguide stack, wherein the second group of adhesives consists of adhesives more susceptible to chemical etching or heating removal than respective adhesives in the first group of adhesives.

12. The method of claim 11, comprising:

cutting the at least one of the first waveguide slices along a plane perpendicular to top and bottom surfaces of the third waveguide slices and that intersects an edge at which the at least one of the first waveguide slices joins the mixer block to form an aperture surface.

13. The method of claim 12, comprising:

treating top surfaces of coupling-in plates to make the top surfaces of the coupling-in plates reflective or diffractive;

bonding the top surfaces of the coupling-in plates together using an adhesive selected from the second group of adhesives to form a coupling-in stack having top and bottom surfaces; and cutting the coupling-in stack along planes at acute angles relative to the top and bottom surfaces of the coupling-in stack to form one or more coupling-in stack segments including coupling-in plane segments.

14. The method of claim 12, comprising:

treating top surfaces of coupling-in plates to make the top surfaces of the coupling-in plates reflective or diffractive;

bonding the top surfaces of the coupling-in plates to first surfaces of sacrificial plates using an adhesive selected from the first group of adhesives and bonding bottom surfaces of the coupling-in plates to second surfaces of the sacrificial plates using an adhesive selected from the second group of adhesives to form a coupling-in stack having top and bottom surfaces; and cutting the coupling-in stack along planes at acute angles relative to the top and bottom surfaces of the coupling-in stack to form one or more coupling-in stack segments including coupling-in plane segments.

15. The method of claim 13, comprising:

bonding a coupling-in stack segment to the aperture surface with an adhesive selected from the first group to form a third waveguide stack;

cutting the third waveguide stack along planes corresponding to the bottom surfaces of the second waveguide slices to form fourth waveguide slices; and removing portions bonded using an adhesive selected from the second group of adhesives by at least one of chemical etching or heating.

16. The method of claim 14, comprising:

bonding a coupling-in stack segment to the aperture surface with an adhesive selected from the first group to form a third waveguide stack;

cutting the third waveguide stack along planes corresponding to the bottom surfaces of the second waveguide slices to form fourth waveguide slices; and removing portions bonded using an adhesive selected from the second group of adhesives by at least one of chemical etching or heating.

* * * * *